United States Patent
Albrecht et al.

(10) Patent No.: US 7,123,440 B2
(45) Date of Patent: Oct. 17, 2006

(54) HERMETICALLY SEALED ELECTRONICS ARRANGEMENT AND APPROACH

(75) Inventors: David Albrecht, San Jose, CA (US);
Barry Stipe, San Jose, CA (US);
Timothy C. Strand, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 84 days.

(21) Appl. No.: 10/673,593

(22) Filed: Sep. 29, 2003

(65) Prior Publication Data
US 2005/0068666 A1    Mar. 31, 2005

(51) Int. Cl.
*G11B 33/14* (2006.01)
(52) U.S. Cl. .................................. 360/97.02
(58) Field of Classification Search ... 360/97.01–99.12
See application file for complete search history.

(56) References Cited

U.S. PATENT DOCUMENTS

| | | | |
|---|---|---|---|
| 4,488,192 A | 12/1984 | Treseder | |
| 4,521,668 A | 6/1985 | Osial et al. | |
| 4,556,969 A * | 12/1985 | Treseder et al. | 720/736 |
| 4,665,294 A | 5/1987 | Hira et al. | |
| 4,724,499 A * | 2/1988 | Bratvold et al. | 360/98.01 |
| 4,760,240 A | 7/1988 | Iikawa et al. | |
| 5,014,142 A * | 5/1991 | Nakanishi et al. | 360/98.01 |
| 5,109,594 A | 5/1992 | Sharp et al. | |
| 5,193,046 A * | 3/1993 | Lemke et al. | 360/97.02 |
| 5,298,683 A | 3/1994 | Taylor | |
| 5,392,177 A | 2/1995 | Chainer et al. | |
| 5,405,272 A | 4/1995 | Rapoza | |
| 5,454,157 A | 10/1995 | Ananth et al. | |
| 5,546,250 A * | 8/1996 | Diel | 360/97.02 |
| 5,596,486 A | 1/1997 | Young et al. | |
| 5,623,597 A * | 4/1997 | Kikinis | 713/200 |
| 5,811,756 A | 9/1998 | Horita et al. | |
| 5,940,279 A | 8/1999 | Gademann et al. | |
| 6,355,362 B1 | 3/2002 | Jones et al. | |
| 6,392,838 B1 | 5/2002 | Hearn et al. | |
| 6,430,000 B1 | 8/2002 | Rent | |

FOREIGN PATENT DOCUMENTS

| | | |
|---|---|---|
| JP | 62071078 | 1/1987 |
| JP | 07-006577 | 1/1995 |
| JP | 08-161881 | 6/1996 |

* cited by examiner

*Primary Examiner*—A. J. Heinz
(74) *Attorney, Agent, or Firm*—David W. Lynch; Chambliss, Bahner & Stophel P.C.

(57) ABSTRACT

A hermetic sealing approach involves welding an Aluminum cover onto a low-cost Aluminum housing. According to an example embodiment of the present invention, a metal housing having a base and sidewalls extending upward therefrom is adapted to receive and couple to an HDD arrangement. The metal housing is formed using material and processing (e.g., cold formed or die cast Aluminum) that are relatively inexpensive. A feedthrough arrangement including a plurality of communication pins extends through an opening in the base and is coupled thereto, with the communication pins adapted to pass signals between the inside and the outside of the metal housing. A metal cover is welded to an upper portion of the sidewalls and, with the feedthrough arrangement, hermetically seals the metal housing.

46 Claims, 6 Drawing Sheets

HERMETICALLY SEALED ELECTRONICS ARRANGEMENT AND APPROACH

BACKGROUND OF THE INVENTION

1. Field of the Invention

This invention relates in general to electronics and electromechanical equipment, and more particularly to such equipment that is susceptible to corrosion and other damage.

2. Description of Related Art

Many types of electronic and electromechanical equipment are susceptible to corrosion and damage. In particular, when moisture is present with electronic circuits and devices, corrosion tends to occur. In addition, during device processing and implementation, damage can occur to components thereof. The reduction and/or elimination of such corrosion and damage has been important to the operation and longevity of electronic and electromechanical equipment.

One type of equipment that is highly susceptible to corrosion is recording equipment. The functionality and operation of such equipment has become increasingly important, such that corrosion and other damage can have drastic consequences. For example, magnetic recording is a key and invaluable segment of the information-processing industry. While the basic principles are one hundred years old for early tape devices and over forty years old for magnetic hard disk drives, an influx of technical innovations continues to extend the storage capacity and performance of magnetic recording products.

Mass storage devices including magnetic disk drives have been important components of computing platforms. The magnetic disk drive typically includes a rotating magnetic disk, write and read heads that are suspended by a suspension arm above the rotating magnetic disk and an actuator that swings the suspension arm to place the read and write heads over selected circular tracks on the rotating disk. The read and write heads are directly mounted on a slider that has an Air-Bearing Surface (ABS) between the slider and the rotating disk. The suspension arm biases the slider into contact with the surface of the magnetic disk when the magnetic disk is not rotating. However, when the magnetic disk rotates, air is swirled by the rotating disk adjacent to the ABS causing the slider to ride on a cushion of air just above the surface of the rotating magnetic disk. The write and read heads are employed for writing magnetic data to and reading magnetic data from the rotating disk. The read and write heads are connected to processing circuitry that operates according to a computer program to implement the write and read functions.

Unfortunately, corrosion often occurs in magnetic disk drives and heads due to the presence of moisture, which acts as a thin-film electrolyte in combination with oxygen and certain contaminants to drive chemical reactions. To protect against corrosion and damage, carbon-containing overcoats have been used on the disks and heads. Unfortunately, typical overcoats can inhibit the ability to scale the areal density higher because the thickness of the overcoat must be reduced accordingly. As the overcoat is thinned, it loses its ability to protect the disks and heads from corrosion and damage. For example, when overcoats are thinned to about two nanometers or less, the head and disk become particularly susceptible to corrosion and damage.

For HDDs, the type of environment in which the drive resides also significantly affects its performance characteristics. For example, since disk drive performance is determined largely by the rotational speed of the disks, this speed has increased over time. Much of the power dissipated by HDDs is due to drag from air in the HDD enclosure. At low speed, dissipation is due to viscous drag and the power (P) scales approximately according to the equation $$P \propto \eta v^2 \qquad \text{(Equation 1)}$$

wherein:

$\eta$ is viscosity and $v$ is velocity.

At the very high speeds and large Reynolds numbers inside HDDs, the power dissipation is largely due to form drag and the power scales approximately according to the equation $$P \propto \rho v^3 \qquad \text{(Equation 2)}$$

wherein $\rho$ is the is the density of the gas in the HDD enclosure. Form drag as referenced above relates to drag forces on the spinning disk of the HDD that results from the separation of air near the disk surface. The Reynolds number is a dimensionless ratio of the inertial flow forces to the viscous forces within a fluid, here the environment in which the HDD resides.

Many approaches have previously been used for sealing magnetic disk drives and other electronics equipment to inhibit corrosion and/or to provide an environment that is otherwise beneficial to HDD operation. For example, HDDs have previously been sealed in a non-hermetic fashion to prevent particles from entering the drive using a breather filter to equalize pressure (e.g., as altitude changes). Typical seals employed for HDDs use polymers such as elastomer gaskets and adhesive tape. Unfortunately, these approaches do not prevent moisture from passing into the enclosures (HDDs) that they seal. For instance, the solubility of water in polymers is very high, resulting in high permeation rates for polymer seals. The permeation rate of a gas through a solid is given by the equation $$Q = DbPA/h \qquad \text{(Equation 3)}$$

with the permeation constant K given by K=Db and wherein:

Q is the permeation rate,

D is the diffusion coefficient, b is the solubility,

P is the pressure difference across the solid,

A is the cross-sectional area of the solid, and h is thickness of the solid.

Typical applications involve upwards of about 15 different seals for a single enclosure, with each seal being susceptible to permeation as a function of the above equation(s).

Other approaches to providing desirable sealing are typically difficult to implement and/or expensive. For instance, canning-type methods involving compressed polymers and complex geometry are not readily applicable to HDD implementations. Similarly, sealing approaches involving metal gaskets typically involve relatively high compression forces that are not applicable to typical HDDs, which do not exhibit the stiffness or other characteristics for accommodating large compression forces. Achieving such stiffness or other characteristics for HDDs and other electronic/electro-mechanical equipment would typically involve expensive and bulky enclosures.

The above-discussed issues have presented challenges to the manufacture and implementation of disk drives and other electronics equipment.

SUMMARY OF THE INVENTION

To overcome the above-discussed issues and others that will become apparent upon reading and understanding the present specification, the present invention is directed to a method and apparatus that addresses these issues.

In one embodiment according to the present invention, a hermetic sealing approach is implemented with electronic or electromechanical equipment, such as disk drives, that is susceptible to corrosion. The equipment is hermetically sealed in a low-humidity environment, thereby preventing moisture from reaching portions of the equipment that are susceptible to corrosion. With this approach, the corrosion of heads and disks can be reduced and/or eliminated, which allows for the thinning or elimination of protective overcoats on the head and disk. In this regard, the magnetic spacing on disk drives can be reduced independently from overcoat limitations. Moreover, track density, spindle rates and performance can be increased while decreasing drag turbulence, track mis-registration, fly-height (the height above a spinning disk at which heads float) altitude sensitivity and power consumption.

In a more particular example embodiment of the present invention, a magnetic storage system including an HDD is hermetically sealed in a low-humidity, low-density gas environment. The heads of the HDD are implemented without any overcoat protection layer, with the disk having an overcoat that is significantly thin (i.e., less than 2 nanometers) while sufficiently protecting data from head-disk impacts.

In another embodiment according to the present invention, an HDD enclosure includes a metal housing with a thin cover and a multi-pin feedthrough for passing signals to and from an HDD sealed therein. The metal housing is adapted to couple to and substantially enclose the HDD within sidewalls extending upward from a lower base having the opening therein. An upper portion of the sidewalls defines an opening through which the HDD is placed into the metal housing. The feedthrough arrangement includes a flange filling the opening of the lower base and forming a hermetic seal therewith, for example, using a soldered or welded connection. A plurality of connectors extend through the flange for passing signals between the inside and the outside of the HDD enclosure, with each connector forming a hermetic seal with the flange. The metal cover is welded to the upper portion of the sidewalls, after the HDD components are placed into the metal housing, and hermetically seals a low-density gas, such as Helium, Hydrogen, Methane or sub-ambient pressure air, in the metal housing.

In another example embodiment, a computer system includes the HDD enclosure discussed in the preceding paragraph. The system includes a central processor and a communications link coupled and adapted to pass signals between the processor and the HDD. The communications link is coupled to the feedthrough arrangement for communicating with the HDD. Power is also supplied to the HDD via the feedthrough arrangement.

These and various other aspects and features of novelty that characterize the invention are pointed out with particularity to the claims annexed hereto and form a part hereof. However, for a better understanding of the invention, its characteristics, and the applications obtained by its use, reference should be made to the drawings which form a further part hereof, and to accompanying descriptive matter, in which there are illustrated and described specific examples of approaches in accordance with the invention.

BRIEF DESCRIPTION OF THE DRAWINGS

Referring now to the drawings in which like reference numbers represent corresponding parts throughout:

FIGS. 4A–4C illustrate example approaches for coupling a feedthrough arrangement to an enclosure in accordance with the present invention, in which:

DETAILED DESCRIPTION OF THE INVENTION

In the following description, reference is made to the accompanying drawings which form a part hereof, and in which is shown by way of illustration the specific embodiments in which the invention may be practiced. It is to be understood that other embodiments may be utilized as structural changes may be made without departing from the scope of the present invention.

According to an example embodiment of the present invention, a hermetic sealing approach involves forming a circuit enclosure by welding a metal cover to a cold-forged or die-cast metal base, the cover forming a substantial upper portion of the enclosure. A feedthrough is soldered and/or welded into a small opening in the base and forms a substantially hermetic seal therewith. The feedthrough passes a variety of communication signals and power between circuits sealed in the enclosure and exterior circuits. With this approach, electronic components such as hard disk drives (HDDs) and others are hermetically sealed while maintaining a relatively low-cost approach.

In one implementation, a low-density gas is sealed inside the enclosure, with the enclosure substantially preventing the gas from leaking out and moisture from entering the enclosure. As discussed above, most materials are permeable to some extent. In this instance, however, the base, cover, feedthrough and associated welded and/or soldered connections impede the diffusion of the gas and moisture such that the enclosure remains substantially free of moisture and the majority of the gas remains inside the enclosure for many years.

In another example embodiment of the present invention, an HDD having read and write heads suspended above a disk is sealed in a hermetic enclosure as discussed above. The hermetic enclosure is substantially free of moisture and includes a gas having a density that is substantially less than air at standard pressure. With this approach, corrosion, turbulence and other issues common to HDDs in air (at standard pressure) can be reduced and/or eliminated, and the fly-height (height above a disk at which HDD heads float) can also be reduced. In this regard, the read and write heads can be formed substantially free of any protective coatings typically used to protect from head-disk collisions, with the disk having a relatively thin protective coating.

In one implementation, the HDD heads are coated with a protective coating for inhibiting damage during manufacturing, with the coating being subsequently removed by bringing the heads in contact with the disk. For instance, the heads can be brought into contact with the spinning disk by reducing the spindle speed of the disk, reducing pressure in the environment in which the HDD resides and/or actively controlling the fly-height using an actuator.

Figure 1:
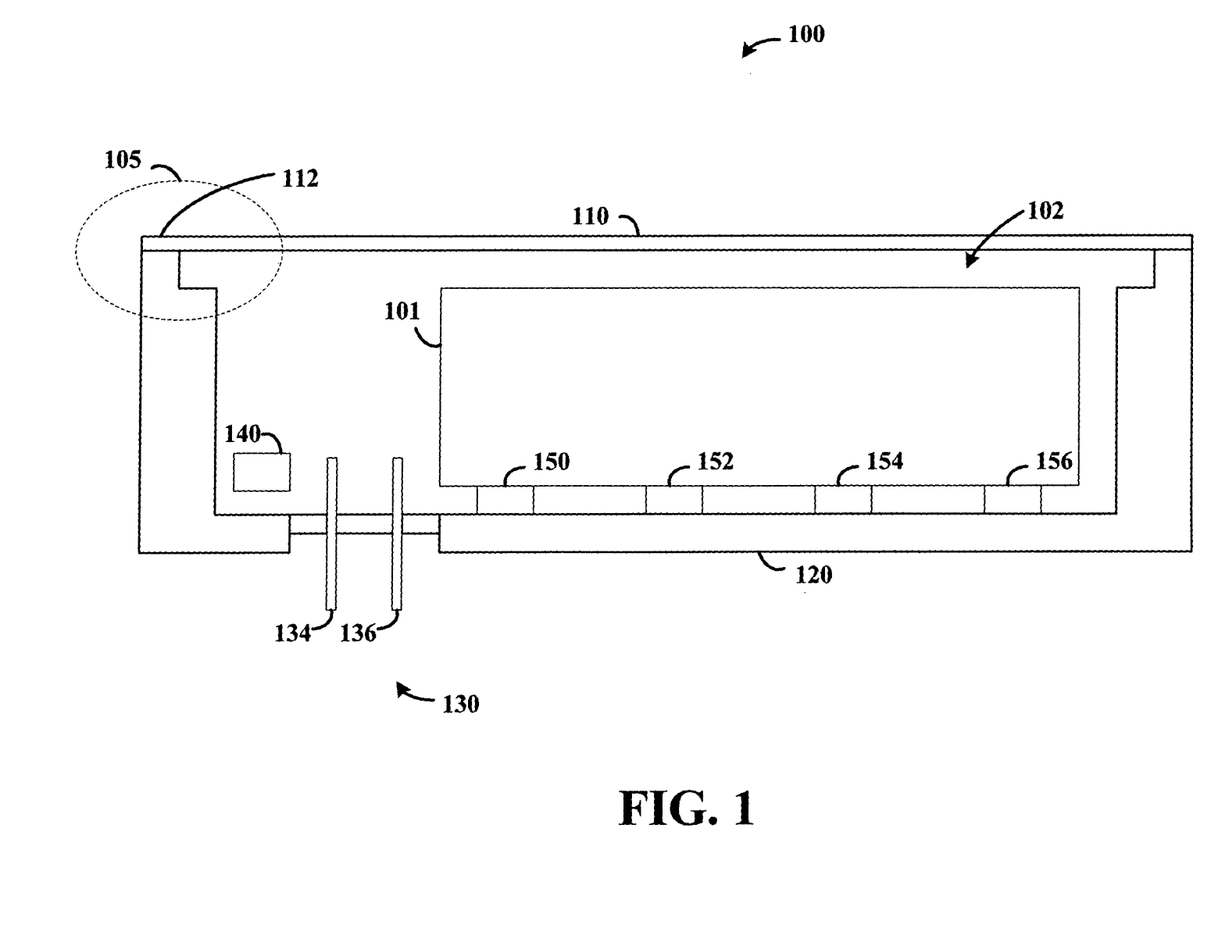
FIG. 1 is a cross-sectional view of an enclosure for magnetic storage media, in accordance with the present invention.

FIG. 1 shows a cross-sectional view of an enclosure 100 having a hermetically-sealed interior 102 and a multi-pin feedthrough 130, according to a more particular example embodiment of the present invention. The enclosure 100 includes a housing 120 with a sheet cover 110 laser-welded to an upper portion the housing's sidewall at a weld location 112, sealing HDD components 101 in the enclosure. The sheet cover 110 covers an opening at an upper portion of the housing 120 that is large enough to accommodate a variety of types of HDD components for sealing in the interior 102 of the enclosure 100. A multi-pin feedthrough 130 extends through the housing 120 and includes pins 134 and 136 that are coupled to the interior of the HDD. Using the multi-pin feedthrough 130, signals are passed to and from the interior HDD components sealed in the enclosure 100. In addition, power is supplied to the HDD components via the feedthrough 130.

In one particular implementation, a plurality of fastener arrangements 150, 152, 154 and 156 are coupled to the housing 120 and adapted for coupling the HDD components to the housing. In one instance, the fastener arrangements include closed-end (blind) screw holes that do not extend through the housing 120 and facilitate the mounting of the HDD components to the housing. These blind screw holes are optionally within the housing 120 (i.e., without the raised portions of the fastener arrangements 150, 152, 154 and 156 extending above the housing). With this approach, the HDD components are secured to the housing 120 without necessarily penetrating the housing and, correspondingly, without introducing potential gas or moisture leakage.

The housing 120 and sheet cover 110 are manufactured using a variety of materials meeting cost, reliability and other needs specific to the particular implementation in which the enclosure 100 is to be applied. For example, one or both of the housing 120 and sheet cover 110 can be manufactured using a substantially eutectic silicon/aluminum alloy (e.g., about 88% aluminum and 12% silicon). In one implementation, the housing 120 is die-cast from A413 or 413 Aluminum, with the sheet cover 110 being made from a material that is resistive to solidification cracking during welding. In this regard, laser-welding a 4047 or 6061 Aluminum sheet cover 110 to an A413 housing 120 results in a relatively crack-free weld.

In another implementation, the housing 120 is cold-forged from an aluminum alloy having relatively low copper and magnesium content (e.g., less than about 1%). For instance, 6061 or 6063 Aluminum can be used for the housing, with the sheet cover 110 being selected from a material that solidifies after the housing 120 and is resistant to cracking during solidification. For example, a material such as 4047 can be used for the sheet cover 110 to hermetically seal the upper portion of the housing 120 when laser welded thereto.

The enclosure 100 seals the HDD components and one or more types of gasses in the interior 102. The type of gas sealed in the enclosure 100 is selected to achieve performance or other characteristics, relative to the HDD components, such as low power consumption, high spin speed and low temperature operation. For instance, a low-density gas such as Helium, Hydrogen, Methane or sub-ambient pressure air can be used to reduce actuator disturbance caused by turbulence, relative to air at standard pressure. In one instance, a pressure of about one-half atmosphere or less is drawn in the enclosure 100 with air sealed therein.

In another implementation, the enclosure 100 is manufactured in a Helium-containing environment such that, when the enclosure is sealed, gasses from the Helium-containing environment are sealed in the interior 102. For instance, an enclosed environment flooded with Helium and including laser welding equipment (e.g., a Nd:YAG pulsed laser) can be used to weld the sheet cover 110 to the housing 120. With this approach, HDD performance characteristics that benefit from such an environment are realized. For example, since Helium is seven times less dense than air, the form drag on spinning disk drives is seven times less for HDDs in Helium, relative to the form drag for HDDs in air. This relative reduction in form drag also reduces the power required to spin the HDD motor, which is useful for reducing power consumption in devices employing the HDD. Alternately, the spin speed of the HDD motor can be increased while maintaining similar power consumption to that realized in an air environment, which is useful for shortening latency times, relative to latency times experienced with HDDs at lower spin speeds.

In another implementation, a low-density gas having less form drag than air is sealed in the interior 102 to reduce turbulence. Correspondingly, nonrepeatable runout (NRRO) and track mis-registration (TMR) that occur due to turbulence are also reduced, relative to that experienced with HDDs operating in air. HDD heads are thus operated with relatively minimal turbulence buffeting (e.g., less than about two nanometers).

In still another implementation, gas having a relatively high thermal conductivity is sealed in the interior 102 for conducting heat away from circuitry in the enclosure 100. For example, using Helium in the interior 102 instead of air relatively increases the thermal conductivity of the environment in which the HDD components reside; the Helium more effectively conducts heat away from the HDD components and correspondingly reduces the operating temperature thereof. Alternately, power or other heat-generating operational characteristics of the HDD components are increased in the Helium environment without necessarily increasing the overall temperature of the interior 102, relative to temperatures experienced using air.

In another example embodiment, the enclosure 100 is adapted for operation at a variety of external pressures. For instance, enclosures are exposed to a variety of pressures in airplane flight applications as the airplane traverses a plurality of altitudes. In addition, temperature variation at different altitudes can also contribute to pressure differences. In this regard, the enclosure 100 is sufficiently sealed such that changes in external pressure do not substantially influence pressure in the interior 102. With this approach, compensation for pressure-related HDD performance changes such as changes in fly-height and others need not be made. (Note: spin speed is regulated and fixed with a controller circuit.) In another example embodiment, the enclosure 100 includes a temperature sensor circuit 140 used to compensate for changes in the operation of the HDD components that are due to temperature. Temperature-related operational characteristics such as those discussed in the background above relative to density are addressed using temperature sensed by the temperature sensor circuit 140. For instance, when the enclosure 100 is exposed to a wide range of temperatures, the operation of the HDD components sealed within is correspondingly adjusted. In one implementation, a temperature change that affects pressure and therefore fly-height is detected and used to adjust fly-height with for example, an actuator thus maintaining a desired fly height.

In another example embodiment of the present invention, the enclosure 100 is formed having a selected amount of moisture therein for a tribological application, i.e., where the moisture is used in connection with lubrication or other aspects of the HDD operation. In this example, a desiccant or other approach is used to maintain a moisture level in the enclosure 100 at a desirable level, that is, sufficient for the tribological application but not causing substantial corrosion to components in the enclosure.

Figure 2A:
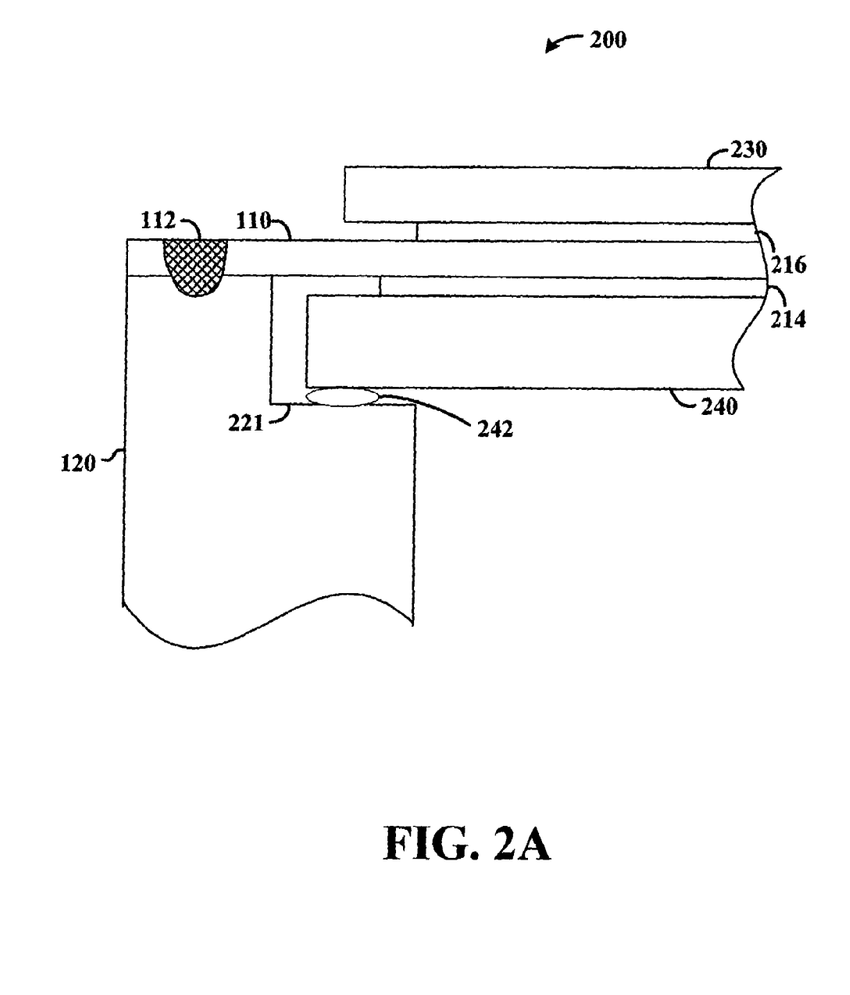
FIG. 2A illustrates an approach for sealing an enclosure for storage media, in accordance with the present invention.

FIG. 2A shows another approach involving a hermetic sealing arrangement 200 for use in connection with the arrangement shown in FIG. 1 at dashed portion 105, according to another example embodiment of the present invention. The hermetic sealing arrangement 200 includes a primary non-hermetic cover 240 and a secondary hermetic sheet cover 110 that hermetically seals the enclosure housing 120 using a laser weld 112. A non-hermetic seal 242 is placed between a flange 221 of the housing 120 and the non-hermetic cover 240. Adhesive 214 (e.g., a pressure-sensitive adhesive) separates the non-hermetic cover 240 from the sheet cover 110 and also holds the sheet cover in place during the laser welding process. Optionally, another adhesive 216 on an upper portion of the sheet cover 110 secures a damping plate 230 to the sheet cover, with the damping plate selected for dampening vibrations, for instance, caused by the HDD components.

Figure 2B:
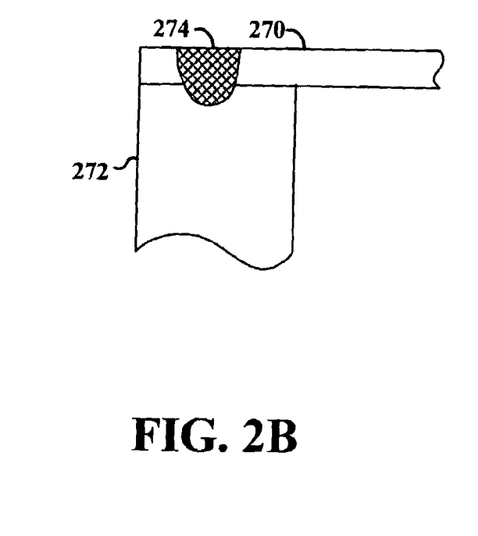
FIGS. 2B–2D show welding approaches that may be implemented in connection with various example embodiments herein, in accordance with the present invention.
Figure 2C:
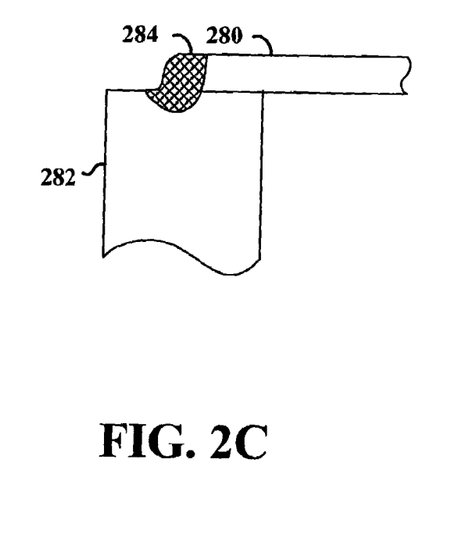
Figure 2D:
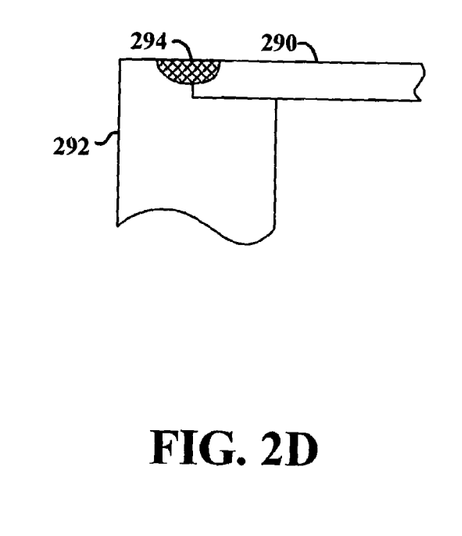

FIGS. 2B–2D show example welding approaches that may be implemented, for example, with the approaches shown in and discussed in connection with FIGS. 1 and 2A. Referring first to FIG. 2B, a metal cover 270 is lap welded to a metal housing 272 with a laser weld 274 in a manner similar to that shown in FIG. 2A, according to another example embodiment of the present invention. Using this approach, the cover 270 receives more heat from the laser than the metal housing 272. In some instances, materials used for the metal housing 272 exhibit a relatively lower temperature solidification point, relative to the metal cover 270, such that the metal cover 270 solidifies before the housing 272 after laser welding.

FIG. 2C shows a metal cover 280 fillet welded to a metal housing 282 with a laser weld 284, according to another example embodiment of the present invention. The direction of the laser used to form the laser weld 284 can be selected to heat the metal housing 282 more than the metal cover 280. With this approach, the metal cover 280 solidifies before the metal housing 282 when welded together using similar materials and/or a material in the metal housing that has a lower solidification temperature than the metal cover.

FIG. 2D shows a metal cover 290 butt welded to a metal housing 292 with a laser weld 294, according to another example embodiment of the present invention. As with the example discussed above in connection with FIG. 2C, the laser is selectively directed such that a majority of the laser impinges upon the metal housing 292, relative to the metal cover 290, heating the metal housing more than the metal cover 290. Using appropriate metal combinations for the metal housing and cover (e.g., as discussed above), the welded portion of the metal cover 290 solidifies prior to the metal housing 292, inhibiting cracking and other problems with the metal housing.

Figure 3A:
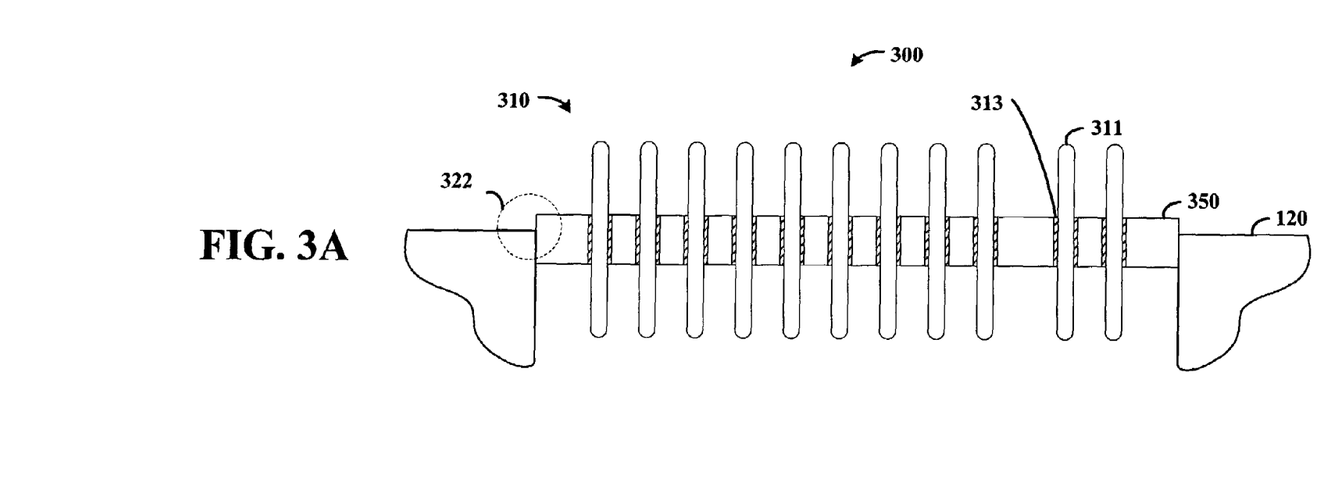
FIGS. 3A and 3B illustrate front and top views of a feedthrough arrangement for a storage media enclosure in accordance with the present invention.
Figure 3B:
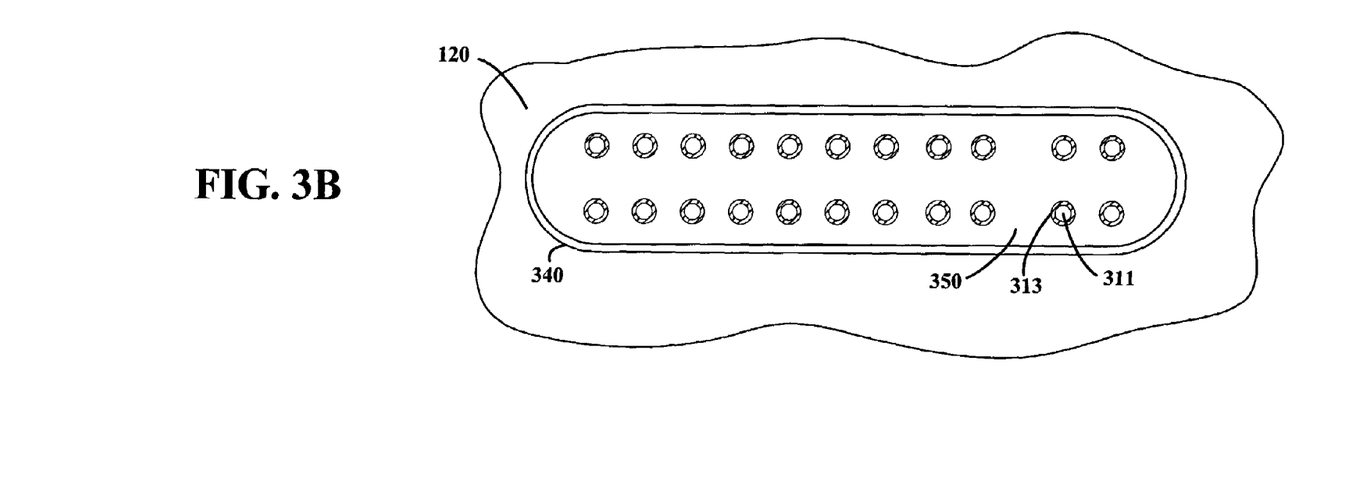

FIGS. 3A and 3B show side and top views of an example feedthrough 300 that can be implemented as feedthrough 130 shown in FIG. 1, according to another example embodiment of the present invention. The feedthrough 300 includes an array 310 of steel pins extending through a flange 350 that is soldered to the housing 120 using, for example, a tin-silver solder (e.g., 4% silver) with flux. The material used for the flange 350 is selected for compatibility with the material in the housing 120 and to reduce stress on the solder 340 that is used to couple the flange to the housing.

In one implementation, the housing 120 includes A413 Aluminum and the flange 350 includes electroless nickel plated 304 stainless steel (e.g., stamped from a sheet). Glass beads separate each steel pin in the array 310 where it extends through the flange 350. For instance, referring to pin 311, glass and/or ceramic beads 313 are placed around the pin 311 and between the pin and the flange 350 as shown in both FIGS. 3A and 3B. When materials such as the above-discussed stainless steel are used for the flange 350, the expansion of the flange forms a robust compression seal with the beads 313. In addition, the glass and/or ceramic beads 313 can be fused to steel-oxide that forms on the surface of the steel under these conditions.

Once installed, the seal between the feedthrough 300 and the housing 120 is optionally leak-checked, for example, using a mass spectrometer. Referring again to FIG. 1, the HDD components are then placed in the housing 120 and coupled to the pins in the feedthrough 300, for example, using flex circuits for carrying actuator connections and motor connections to the HDD. By leak-checking the seal prior to proceeding with further manufacturing steps, defective seals can be detected early, alleviating the need to later repeat manufacturing steps and/or the disposal of some or all of the enclosure 100.

In a more particular implementation, one or more of the array 310 of pins, feedthrough flange 350 and housing 120 are plated. In one example, about 100–200 micro inches of electroless nickel are plated onto one or more of the pin array 310, feedthrough flange 350 and housing 120. With this approach, a substantially oxide-free surface can be achieved on these plated components, which is useful for soldering and other purposes, such as reducing leaks due to porosity in the components.

In some applications involving subsequent laser welding processes, it has been found desirable to inhibit and/or remove plating from portions of the housing 120 that are to be laser-welded. In one instance, portions of the housing 120 are masked, prior to plating. The mask inhibits plating from areas to be welded and thereby inhibits nickel contamination at the weld area. For example, masking the upper surface of the housing 120 to which the sheet cover 110 is to be welded prevents nickel contamination in the housing where the weld is to take place.

One example masking approach involves the use of an e-coat (electron coating process) as a mask. The housing 120 is e-coated with portions of the e-coating being machined or otherwise removed in locations where the housing is to be plated. The housing 120 is then plated, with the remaining e-coating acting as a mask.

In another instance, plating is removed from portions of the housing 120 where laser welding is to take place. For example, nickel plating on the housing 120 can be removed at an upper portion thereof using a milling process to provide a surface that is suitable for welding to the sheet cover 110.

Figure 4A:
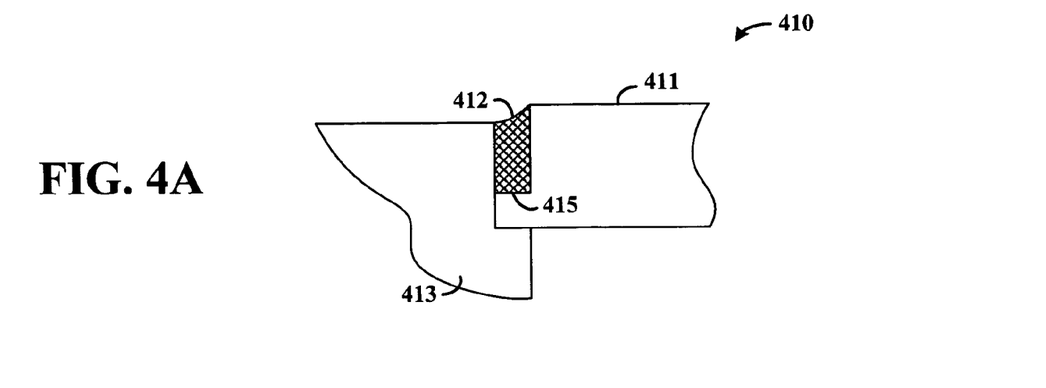
FIG. 4A shows a solder-in-channel approach.
Figure 4B:
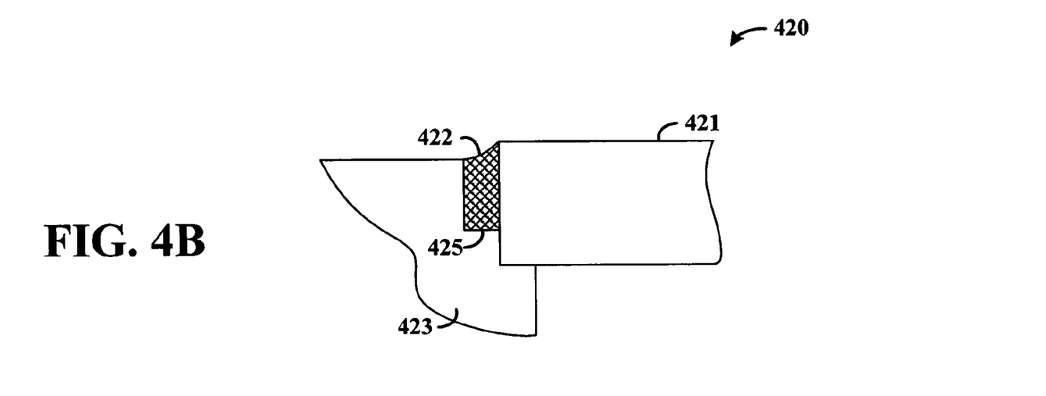
FIG. 4B shows another solder-in-channel approach.
Figure 4C:
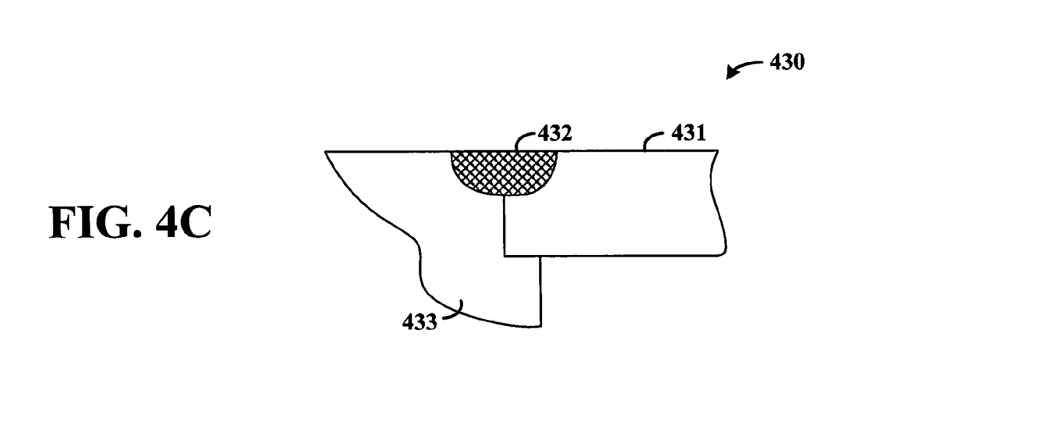
FIG. 4C shows a laser weld approach.

FIGS. 4A–4C show example approaches that may be used for coupling a feedthrough flange to a housing, according to other example embodiments of the present invention. These approaches are applicable, for example, for coupling the flange 350 shown in FIGS. 3A and 3B to the housing 120 shown in FIG. 1; for purposes of illustration, FIGS. 4A–4C are discussed in connection with FIGS. 1, 3A and 3B.

Referring first to FIG. 4A, a flange-housing interface 410 includes a flange 411 having a solder channel 415 for holding solder 412. When used in connection with FIG. 3A, for example, the dashed portion 322 of FIG. 3A is implemented by forming solder in the solder channel 415 that, when solidified, holds the flange 411 to the housing 413 (e.g., corresponding to the housing 120 in FIG. 1).

Referring to FIG. 4B, a flange-housing interface 420 includes housing 423 (e.g., also corresponding to the housing 120 in FIG. 1) having a solder channel 425 therein for holding solder 422. When used in connection with FIG. 3A, for example, the flange-housing interface 420 is implemented with the dashed portion 322, with solder formed in the solder channel 425 that, when solidified, holds the flange 421 to the housing 423.

FIG. 4C also shows a flange-housing interface 430, with a laser-welding approach being used instead of a soldering approach. The flange-housing interface 430 includes a housing 433 that abuts an Aluminum flange 431, with a laser-welded portion 432 coupling the housing to the flange. When used in connection with FIG. 3A, for example, the flange-housing interface 420 is implemented with the dashed portion 322. The material selected for the flange 350 is compatible for laser welding with the housing 120 (housing 433). For instance, 4032 or 4047 Aluminum can be used for the flange 431 when used in connection with a housing 433 formed of A413 or 413 die cast aluminum, or 6061 or 6063 cold forged Aluminum, as discussed above Alternatively, the flange may be made from 6061 or 6063 aluminum sheet metal and welded to an A413 or 413 die cast housing. In one implementation, the array 310 of pins includes a material such as copper-beryllium or 304 stainless steel that does not require plating when used in connection with an Aluminum flange 431 and such a laser-welding approach.

Figure 5:
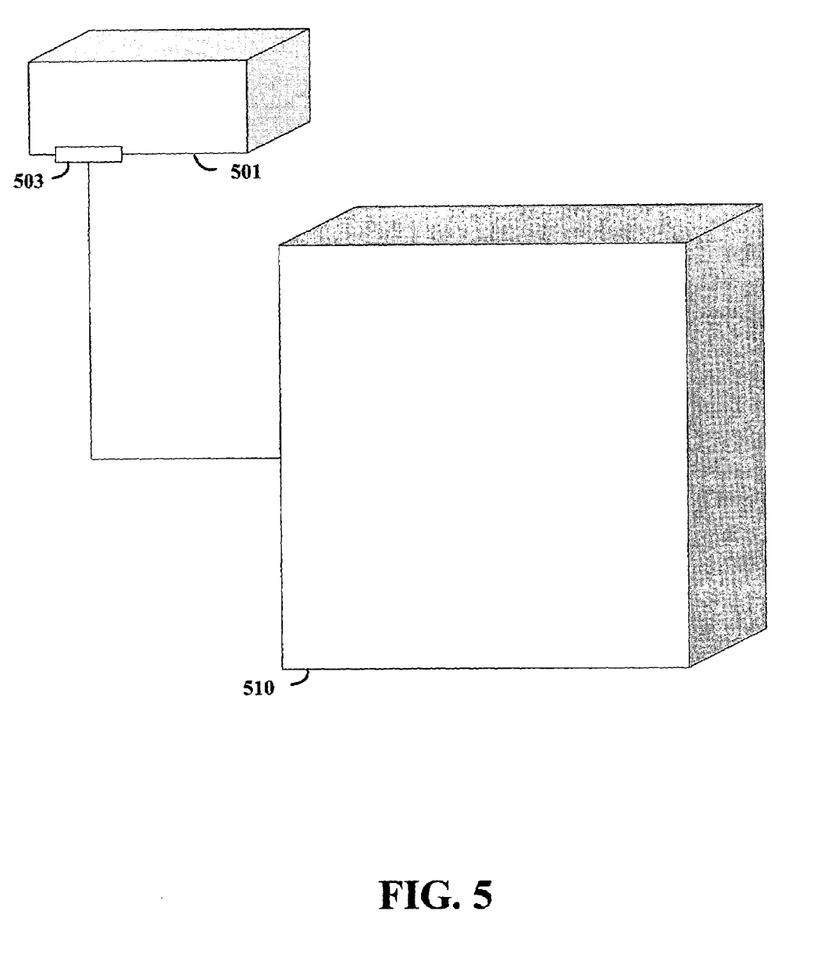
FIG. 5 shows a computer system including a hermetically-sealed HDD arrangement, in accordance with the present invention.

FIG. 5 shows a system 500 including a hermetically-sealed HDD 501, according to another example embodiment of the present invention. The HDD 501 may, for example, include the enclosure 100 and HDD components shown in FIG. 1. A processor in a computer arrangement 510 accesses the HDD 501 for storing data therein, with communications between the computer arrangement and the HDD being passed via a feedthrough 503. Optionally, the computer arrangement 510 includes the HDD 501. The feedthrough 503 is coupled to an enclosure at the HDD 501 and hermetically sealed therewith using an approach and arrangement that are similar, for example, to that discussed in connection with FIGS. 3A and 3B.

The foregoing description of various example embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A hermetically sealed hard disk drive (HDD) enclosure, comprising:
   an aluminum alloy housing comprising two sides, a bottom and a connector opening in the bottom of the housing;
   a hard disk drive assembly disposed within the housing;
   fasteners disposed along the inside bottom of the housing for fastening the hard disk drive assembly only to the bottom of the housing without creating an opening in the housing;
   a multi-pin feedthrough disposed within the connector opening in the bottom of the housing, the multi-pin connector comprising a flange having a plurality of signal pins being disposed within openings therein, wherein ceramic beads seal the openings between the signal pins and the flange;
   a coalesced metal joint securing the multi-pin feedthrough to the opening of the housing and providing a first hermetic seal;
   a first lid disposed over the hard disk drive assembly and coupled to a flange in the side walls of the housing via a non-hermetic seal;
   a pressure sensitive adhesive disposed over the first lid;
   a second lid disposed over the first lid, the second lid comprising an aluminum alloy and being engaged by the pressure sensitive adhesive disposed over the first lid; and
   a laser weld formed between the second lid and the housing along the periphery of the second lid, the laser weld providing a second hermetic seal.

2. The hermetically sealed HDD enclosure of claim 1 further comprises a pressure sensitive adhesive disposed over the second lid and a dampening plate adhered to the second lid via the pressure sensitive adhesive disposed over the second lid.

3. The hermetically sealed HDD enclosure of claim 2, wherein the ceramic beads comprise glass.

4. The hermetically sealed HDD enclosure of claim 3 further comprising a low density, low-humidity gas disposed within the housing.

5. The hermetically sealed HDD enclosure of claim 4, wherein the housing has a solidification temperature substantially equal to a solidification temperature of the second lid.

6. The hermetically sealed HDD enclosure of claim 1, wherein the ceramic beads comprise glass.

7. The hermetically sealed HDD enclosure of claim 1 further comprising a low density, low-humidity gas disposed within the housing.

8. The hermetically sealed HDD enclosure of claim 1, wherein the housing has a solidification temperature substantially equal to a solidification temperature of the second lid.

9. The hermetically sealed HDD enclosure of claim 1, wherein the housing comprises a cold-forged aluminum alloy housing.

10. The hermetically sealed HDD enclosure of claim 1, wherein the housing comprises a die-cast aluminum alloy housing.

11. The hermetically sealed HDD enclosure of claim 1, wherein the coalesced metal joint comprises a weld.

12. The hermetically sealed HDD enclosure of claim 1, wherein the coalesced metal joint comprises a solder joint.

13. The hermetically sealed HDD enclosure of claim 1, wherein the feedthrough flange and the housing have substantially similar expansion coefficients.

14. The hermetically sealed HDD enclosure of claim 1 further comprising a temperature sensor disposed within the housing with the hard disk drive assembly, the temperature sensor being configured and arranged to detect the temperature in the housing for adjusting operational parameters of the hard disk drive assembly as a function of the detected temperature.

15. The hermetically sealed HDD enclosure of claim 1, wherein the aluminum alloy housing comprises an eutectic aluminum alloy housing.

16. The hermetically sealed HDD enclosure of claim 1, wherein the second lid has a thickness less than a thickness of the first lid and has a low solidification temperature and a high cracking resistance.

17. The hermetically sealed HDD enclosure of claim 1, wherein the housing further comprises a step for holding the feedthrough flange.

18. The hermetically sealed HDD enclosure of claim 1, wherein the housing includes a flange-housing interface comprising a solder channel for holding solder therein.

19. The hermetically sealed HDD enclosure of claim 1, wherein the housing and the second lid comprise an aluminum alloy of about 88% aluminum and 12% silicon.

20. A computer system, comprising:
   a central processor;
   a hermetically sealed hard disk drive; and
   a communications link coupled and adapted to pass signals between the processor and the hermetically sealed hard disk drive;
   wherein the hermetically sealed hard disk drive comprises:
      an aluminum alloy housing comprising two sides, a bottom and a connector opening in the bottom of the housing;
      a hard disk drive assembly disposed within the housing;
      fasteners disposed along the inside bottom of the housing for fastening the hard disk drive assembly to the bottom of the housing only without creating an opening in the housing;
      a multi-pin feedthrough disposed within the connector opening in the bottom of the housing, the multi-pin connector comprising a flange having a plurality of signal pins being disposed within openings therein, wherein ceramic beads seal the openings between the signal pins and the flange;
      a coalesced metal joint securing the multi-pin feedthrough to the opening of the housing and providing a first hermetic seal;
      a first lid disposed over the hard disk drive assembly and coupled to a flange in the side walls of the housing via a non-hermetic seal;
      a pressure sensitive adhesive disposed over the first lid;
      a second lid disposed over the first lid, the second lid comprising an aluminum alloy and being engaged by the pressure sensitive adhesive disposed over the first lid; and
      a laser weld formed between the second lid and the housing along the periphery of the second lid, the laser weld providing a second hermetic seal.

21. The computer system of claim 20 further comprises a pressure sensitive adhesive disposed over the second lid and a dampening plate adhered to the second lid via the pressure sensitive adhesive disposed over the second lid.

22. The computer system of claim 21, wherein the ceramic beads comprise glass.

23. The computer system of claim 22 further comprising a low density, low-humidity gas disposed within the housing.

24. The computer system of claim 23, wherein the housing has a solidification temperature substantially equal to a solidification temperature of the second lid.

25. The computer system of claim 20, wherein the ceramic beads comprise glass.

26. The computer system of claim 20 further comprising a low density, low-humidity gas disposed within the housing.

27. The computer system of claim 20, wherein the housing has a solidification temperature substantially equal to a solidification temperature of the second lid.

28. The computer system of claim 20, wherein the housing comprises a cold-forged aluminum alloy housing.

29. The computer system of claim 20, wherein the housing comprises a die-cast aluminum alloy housing.

30. The computer system of claim 20, wherein the coalesced metal joint comprises a weld.

31. The computer system of claim 20, wherein the coalesced metal joint comprises a solder joint.

32. The computer system of claim 20, wherein the feedthrough flange and the housing have substantially similar expansion coefficients.

33. The computer system of claim 20 further comprising a temperature sensor disposed within the housing with the hard disk drive assembly, the temperature sensor being configured and arranged to detect the temperature in the housing for adjusting operational parameters of the hard disk drive assembly as a function of the detected temperature.

34. The computer system of claim 20, wherein the aluminum alloy housing comprises an eutectic aluminum alloy housing.

35. The computer system of claim 20, wherein the second lid has a thickness less than a thickness of the first lid and has a low solidification temperature and a high cracking resistance.

36. The computer system of claim 20, wherein the housing further comprises a step for holding the feedthrough flange.

37. The computer system of claim 20, wherein the housing includes a flange-housing interface comprising a solder channel for holding solder therein.

38. The computer system of claim 20, wherein the housing and the second lid comprise an aluminum alloy of about 88% aluminum and 12% silicon.

39. A method for manufacturing a hard disk drive (HDD) enclosure, the method comprising:
   forming an aluminum alloy housing comprising two sides, a bottom and a connector opening in the bottom of the housing;
   fastening a hard disk drive assembly disposed within the housing along the inside bottom of the housing only without creating an opening in the housing;
   positioning a multi-pin feedthrough within the connector opening in the bottom of the housing, the multi-pin connector comprising a flange having a plurality of signal pins being disposed within openings therein;
   forming a coalesced metal joint to secure the multi-pin feedthrough to the opening of the housing and to provide a first hermetic seal;
   sealing the openings between the signal pins and the flange using ceramic beads that expand when the coalesced metal joint is formed;
   placing a first lid over the hard disk drive assembly;
   coupling the first lid to a flange in the side walls of the housing using a non-hermetic seal;
   depositing a pressure sensitive adhesive over the first lid;
   placing, over the first lid, a second lid, the second lid comprising an aluminum alloy and engaging the pressure sensitive adhesive disposed over the first lid; and
   laser welding the second lid and the housing along the periphery of the second lid to form a second hermetic seal.

40. The method of claim 39 further comprising providing a low density, low-humidity gas within the housing prior to laser welding the second lid and housing together.

41. The method of claim 39, wherein the forming a coalesced metal joint to secure the multi-pin feedthrough to the opening of the housing and to provide a first hermetic seal further comprises welding the multi-pin feedthrough to the opening of the housing.

42. The method of claim 39, wherein the forming a coalesced metal joint to secure the multi-pin feedthrough to the opening of the housing and to provide a first hermetic seal further comprises soldering the multi-pin feedthrough to the opening of the housing.

43. The method of claim 39 further comprising;

disposing a temperature sensor within the housing with the hard disk drive assembly;

detecting temperature in the housing;

adjusting operational parameters of the hard disk drive assembly as a function of the detected temperature.

44. The method of claim 39, wherein the forming an aluminum alloy housing further comprises a step for holding the feedthrough flange.

45. The method of claim 39, wherein the forming an aluminum alloy housing further comprises forming a flange-housing interface having a solder channel for holding solder therein.

46. The method of claim 39, wherein the aluminum alloy housing and the second lid further comprise an aluminum alloy of about 88% aluminum and 12% silicon.

* * * * *